United States Patent
Hallen

(10) Patent No.: US 10,267,441 B2
(45) Date of Patent: Apr. 23, 2019

(54) CONNECTION, FITTING AND PRODUCTION METHOD

(71) Applicant: Uponor Innovation Ab, Virsbo (SE)

(72) Inventor: Mats Hallen, Virsbo (SE)

(73) Assignee: Uponor Innovation Ab, Virsbo (SE)

( * ) Notice: Subject to any disclaimer, the term of this patent is extended or adjusted under 35 U.S.C. 154(b) by 840 days.

(21) Appl. No.: 14/672,937

(22) Filed: Mar. 30, 2015

(65) Prior Publication Data

US 2015/0276100 A1 Oct. 1, 2015

(30) Foreign Application Priority Data

Mar. 31, 2014 (DE) .................... 20 2014 101 522 U

(51) Int. Cl.
*F16L 19/00* (2006.01)
*F16L 19/02* (2006.01)
*F16L 15/04* (2006.01)

(52) U.S. Cl.
CPC ............... *F16L 19/00* (2013.01); *F16L 15/04* (2013.01); *F16L 19/0231* (2013.01)

(58) Field of Classification Search
CPC ....... F16L 15/04; F16L 19/0231; F16L 19/00; F16L 19/025
See application file for complete search history.

(56) References Cited

U.S. PATENT DOCUMENTS

| | | | |
|---|---|---|---|
| 2,600,162 A | 6/1952 | Frantz | |
| 5,529,348 A | 6/1996 | Wasserman et al. | |
| 5,775,743 A | 7/1998 | Rochelle | |
| 6,412,832 B1 | 7/2002 | Donoho et al. | |
| 2008/0012326 A1 | 1/2008 | Braathen et al. | |
| 2010/0194101 A1* | 8/2010 | Larsson | F16L 19/0231 285/272 |
| 2011/0121566 A1 | 5/2011 | Cowell et al. | |

FOREIGN PATENT DOCUMENTS

| | | | | |
|---|---|---|---|---|
| CA | 2440286 | * | 9/2002 | |
| DE | 3714723 | A1 | 11/1988 | |
| DE | 4206309 | | 9/1993 | |
| DE | 19543567 | | 5/1996 | |
| DE | 19533106 | | 3/1997 | |
| DE | 10214997 | A1 * | 10/2003 | .......... F16L 19/0218 |
| EP | 1760382 | A2 | 8/1998 | |
| EP | 2213923 | | 9/2013 | |
| FR | 1121046 | A * | 7/1956 | .......... F16L 19/0231 |
| WO | 2004/027305 | | 4/2004 | |

\* cited by examiner

*Primary Examiner* — David Bochna
*Assistant Examiner* — James A Linford
(74) *Attorney, Agent, or Firm* — Occhiuti & Rok licek LLP

(57) ABSTRACT

According to one embodiment a pipe connection comprises a connection body produced from a plastic material, the connection body having at least one projecting periphery, arranged on the end side, and having a retaining region located axially downstream of said periphery. The pipe connection further comprises a union nut produced from a metal material, the union nut pushed over the connection body and having an annular depression in a region located opposite the retaining region of the connection body. The pipe connection further comprises a retaining ring arranged in the annular depression between the connection body and the union nut, securing the union nut in a rotatable manner on the connection body.

14 Claims, 3 Drawing Sheets

CONNECTION, FITTING AND PRODUCTION METHOD

RELATED APPLICATION

Under 35 USC 119, this application claims the benefit of the priority date of German Application No. 202014101522.1, filed on Mar. 31, 2014, the contents of which are herein incorporated by reference.

FIELD OF INVENTION

The present invention relates to a connection, in particular a pipe connection, comprising a connection body and a union nut, which is secured in a rotatable manner on the connection body. The invention also relates to a fitting having such a connection and to a method of producing such a connection.

BACKGROUND

Pipe connections having a connection body and a union nut, which is secured in a rotatable manner on the connection body, are known from the prior art. In particular, EP 2 213 923 B1 discloses a connection in the form of a rotary articulation, comprising a pipe part having a first end and a second end, and also comprising a union nut having a first end and a second end. The union nut here is positioned on the pipe part such that the first end of the union nut forms a rotary joint with the first end of the pipe part. For this purpose, the union nut and the pipe part each have at least one projecting periphery, in order to prevent the union nut from being separated from the pipe part. The projecting peripheries make it possible to produce a direct snap-fit joint between the pipe part and the union nut.

In the case of the rotary articulation known from the prior art, both the pipe part and the union nut are produced from a plastics material.

SUMMARY

Although plastics materials have a large number of advantages, including low production costs, lightness in weight and corrosion resistance, there are nevertheless some application areas in which purely plastics-material connections are either unsuitable or undesirable. One reason for this, inter alia, is the relatively low level of hardness of most plastics materials in relation to conventional metal materials, for example brass.

It is an object of the present invention to describe an alternative connection, in particular a pipe connection, which provides for a union nut to be secured reliably on a connection body. The connection described should preferably allow a combination of different materials, in particular of plastics and metal materials.

A first aspect of the invention discloses a pipe connection comprising a connection body produced from a polysulfone material, the connection body having at least one projecting periphery, arranged on the end side, and having a retaining region located axially downstream of said periphery. The pipe connection further comprises a union nut produced from a metal material, the union nut pushed over the connection body and having an annular depression in a region located opposite the retaining region of the connection body. The pipe connection further comprises a retaining ring produced from a polyamide or a polysulfone material, the retaining ring being arranged in the annular depression between the connection body and the union nut, securing the union nut in a rotatable manner on the connection body.

A second aspect of the invention discloses a connection, in particular a pipe connection, comprising a connection body produced from a plastics material, the connection body having at least one projecting periphery, arranged on the end side, and having a retaining region located axially downstream of said periphery. The connection further comprises a union nut, which is pushed over the connection body and has an annular depression in a region located opposite the retaining region of the connection body, and also comprises a retaining ring, which is arranged in the annular depression, between the connection body and the union nut, and secures the union nut in a rotatable manner on the connection body.

Using a retaining ring and a corresponding depression in a union nut means that the surface which secures the union nut on the connection body produced from a plastics material is increased in size in relation to the snap-fit joint of the known rotary articulation. The connection described makes it possible, in addition, to combine a connection body and a union nut made of different materials.

The connection mentioned is suitable, inter alia, for a union nut produced from a metal material, in particular brass. As an alternative, it is also possible to use relatively hard plastics materials. The retaining ring may consist of a polymer material, in particular a polyamide (PA) such as nylon 6-6 or polyphenylsulfone (PPSU). As an alternative, it is also possible to use corrosion-resistant metal materials. The connection body may likewise be produced from a polymer material, in particular a polysulfone material, for example polyphenylsulfone (PPSU). As an alternative, it is also possible here to use corrosion-resistant metal materials. The modular construction of the connection allows for optimized selection of the individual materials.

According to an advantageous configuration, the retaining ring comprises a slit, elastic annular body, wherein the annular body extends over an angle range of less than 360°, in particular over an angle range between 300 and 350°. Such an annular body allows straightforward expansion and compression of the retaining ring, in order for it to be possible for the latter to be introduced straightforwardly into the depression of the union nut.

According to an advantageous configuration, the connection body, in the retaining region, has an at least partially encircling bead and at least one depression arranged between the bead and the projecting periphery. The bead and the depression mean that the connection body is retained reliably in a predetermined position for the purpose of screw-connecting the union nut to a counterpart.

According to an advantageous configuration, the connection further comprises a seal, which is arranged on an end side of the connection body, within the union nut. It is thus possible to establish a fluid-tight joint between the connection and a counterpart.

A third aspect of the invention describes a fitting for a pipe joint, having a basic body and at least one connection according to the second aspect connected to the basic body.

A fourth aspect of the invention describes a method of producing a connection. The method comprises the following steps:

supplying a connection body produced from a plastics material, the connection body having at least one projecting periphery, arranged on the end side, and having a retaining region located axially downstream of said periphery, pushing a union nut, which has an annular depression, onto the connection body axially from an end side of the connection body, and pressing a retaining ring axially into the annular depression from a rear side of the union nut, said rear side being located opposite the end side of the connection body, so that the union nut is mounted in a rotatable manner on the connection body.

The aforementioned method steps make it possible to produce a connection according to the second aspect of the invention.

By virtue of a counterpart with a mating thread complementing a thread of the union nut, in particular a pipe end or a fitting, being positioned on the end side, and by virtue of the union nut being tightened, it is possible for the counterpart to be connected to the connection.

Further advantageous configurations are given in the dependent claims and the following description of exemplary embodiments. Two exemplary embodiments of the invention will be described in detail hereinbelow with reference to the attached figures. To aid understanding, functionally identical parts of different exemplary embodiments are provided with the same designations.

DETAILED DESCRIPTION

Figure 1:
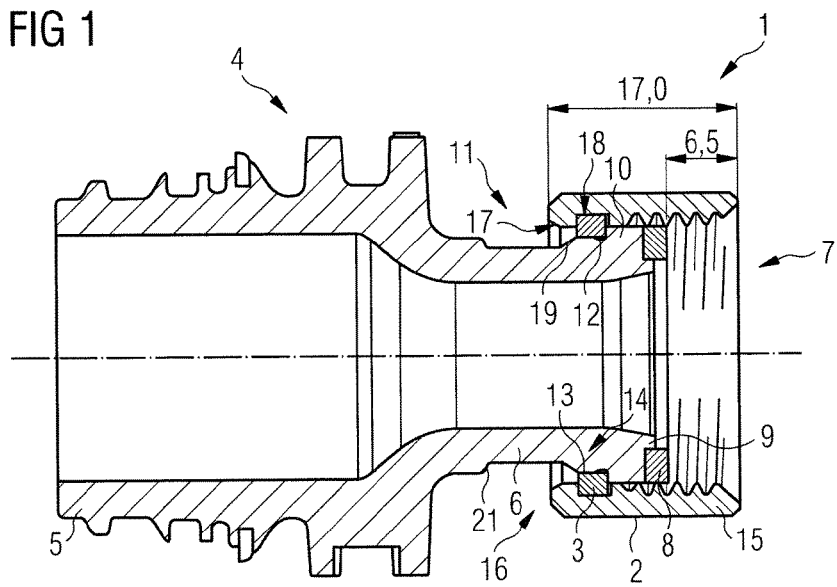
FIG. 1 shows a sectional illustration of a connection according to a first configuration.
Figure 2:
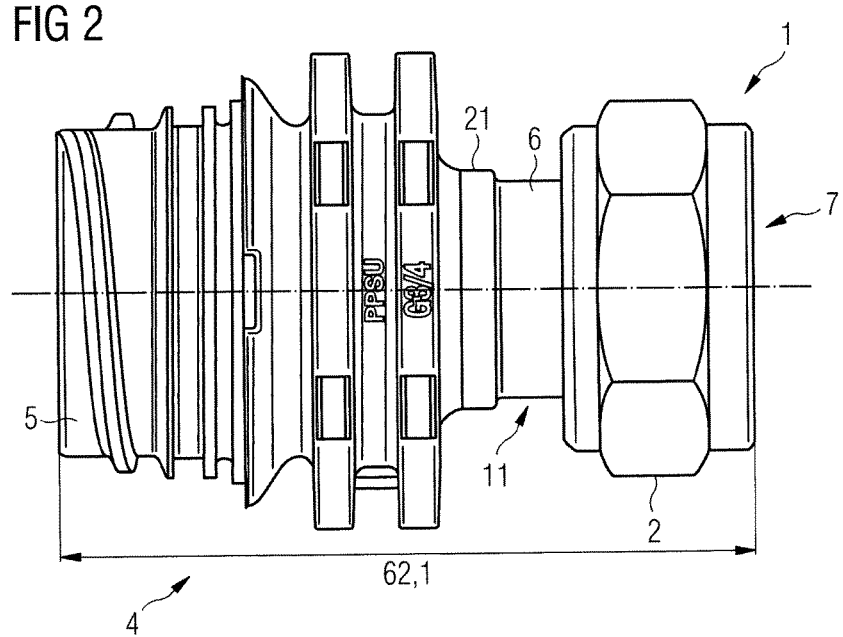
FIG. 2 shows a side view of the connection according to the first configuration.

FIGS. 1 and 2 show a true-to-scale sectional illustration and side view, respectively, of a connection 1. The connection 1 comprises, inter alia, the union nut 2, which is illustrated in FIG. 3, and the retaining ring 3, which is illustrated in FIG. 4.

In the exemplary embodiment described, the connection 1 is part of a fitting 4 having a basic body 5, for example a basic body of a press fitting for the connection of a water pipe (not illustrated in the figures) made of a composite material such as, for example, crosslinked polyethylene (PEX). The basic body 5 has a cylindrical connection body 6, which is arranged at the end of the basic body and has an end side 7. In the exemplary embodiment, the end side 7 has arranged on it, for establishing the sealing of the connection 1, a disc-form seal 8, which is retained by a protrusion 9.

The connection body 6 terminates, on the end side, with a projecting periphery 10 in the form of an annular flange. For a connection of a ¾" joint, the projecting periphery 10 has, for example, an external diameter of 24 mm, in comparison with an external diameter of 20 mm in a tubular region 11 of the connection body 6, said tubular region being located further to the rear. The projecting periphery 10 has located downstream of it, as seen from the direction of the end side 7, a depression 12, which is delimited on a rear side by an annular bead 13. It is also the case that the bead 13 projects beyond the external diameter of the connection body 6 in the tubular region 11. For example, the bead has an external diameter of 22 mm. Together, the bead 13 and the depression 12 form a retaining region 14.

Figure 3:
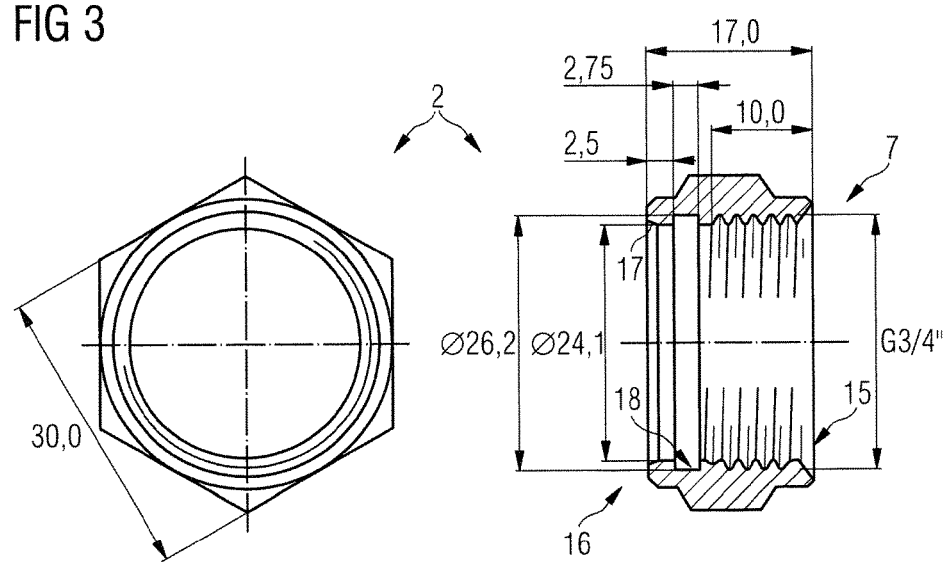
FIG. 3 shows two views of a union nut according to the first configuration.
Figure 4:
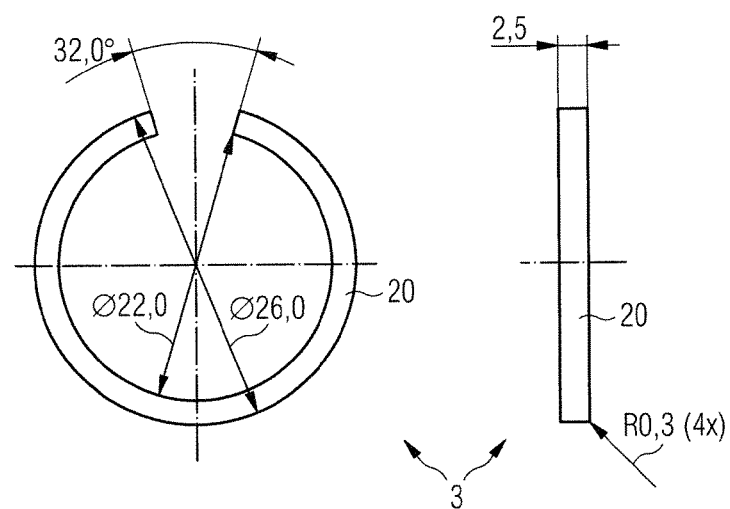
FIG. 4 shows two views of a retaining ring according to the first configuration.

The union nut 2 according to FIG. 3 is arranged over the connection body 6. The union nut 2 has a slightly larger internal diameter than the external diameter of the projecting periphery 10. In the exemplary embodiment described, it has, for example, an internal diameter of 24.1 mm, so that the union nut 2 can be pushed over the end side 7 onto the connection body 6. In a front region, which, in the pushed-on state, is oriented in the direction of the end side 7 of the connection 1, the union nut 2 has a thread 15 for a conventional screw-connection. As already explained, this is, for example, an internal thread for connection to a pipe connection (not illustrated in the figures) or to a further fitting (not illustrated either) having a ¾" external thread. As an alternative, of course, it is also possible to use a union nut having an external thread.

On an opposite rear side 16, the union nut 2 has an inner chamfer 17. Furthermore, on an inner side located opposite the retaining region 14 of the connection body 6, an annular depression 18 is made in the union nut 2. This depression serves for fastening the union nut 2, and mounting it in a rotatable manner, on the connection body 6. For this purpose, the retaining ring 3 is introduced into the depression 18, said retaining ring being latched between the annular depression 18 and the retaining region 14, comprising the bead 13 and the depression 12. As can be seen in FIG. 1, the retaining ring 3 can be introduced into the annular depression 18 from the rear side 16 of the union nut 2. This is aided here by the chamfer 17 of the union nut 2 and a conical transition region 19 between the tubular region 11 and the bead 13.

FIG. 4 shows a detailed illustration of the retaining ring 3 in a front view and a side view. It can be seen here that the retaining ring 3 essentially consists of a slit annular body 20. The slit of the annular body 20 extends over a circumferential angle of approximately 32°. The slit annular body 20 thus extends over an angle range of approximately 328°. Of course, it is also possible to have larger and smaller openings for the slit annular body 20. The opening of the slit annular body 20, possibly in conjunction with the material properties thereof, means that the retaining ring 3 can be easily deformed in the radial direction. In particular it is possible for said retaining ring to be easily compressed by means of the chamfer 17, provided on the rear side 16 of the union nut 2 and widened in diameter by the following conical transition region 19, so that the retaining ring 3 can be introduced straightforwardly into the annular depression 18.

In the exemplary embodiment, the basic body 5 with the connection body 6 connected thereto is produced from polyphenylsulfone (PPSU). The retaining ring 3 consists of polyamide 6,6 (PA). The union nut 2 is produced from a brass material. It can be connected to corresponding screw-connection joints of a pipe connection using commercially available tools. The seal 8, in the exemplary embodiment, consists of the sealing material going by the name of KLINGERsil C4400 and produced by Klinger GmbH, Germany.

In the configurations described, it is merely the union nut 2 which is produced from a metal material, in particular brass. It should be pointed out that the union nut 2 is not in direct contact with a medium, in particular water, channelled through the connection 1. Corrosion of the metal material caused by the medium is therefore avoided. Contamination of the medium by the metal material is also avoided.

It should be pointed out that, instead of a metal material, it is also possible to use a sufficiently hard plastics material, in particular a polymer material such as PPSU, in order to produce the union nut 2. Conversely, it is also possible for the connection body 6 and/or the retaining ring 3 to be produced from corrosion-resistant metal materials.

Figure 5:
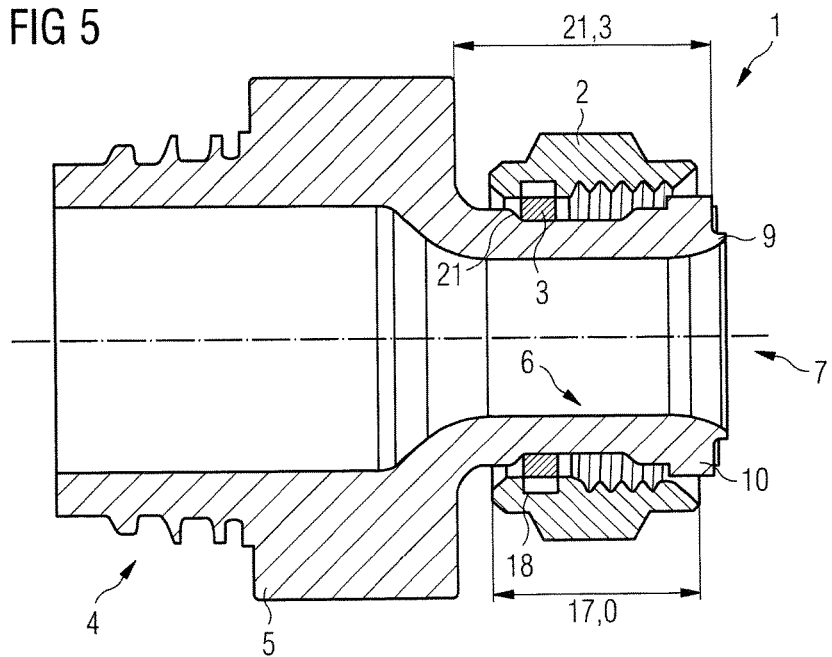
FIG. 5 shows a first sectional illustration of a connection according to a second configuration.
Figure 6:
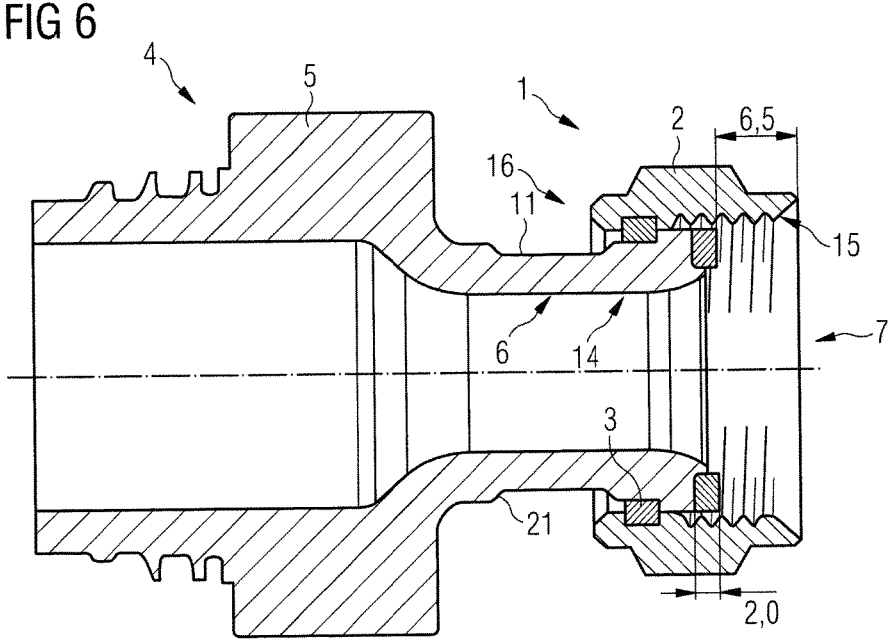
FIG. 6 shows a second sectional illustration of a connection according to the second configuration.

FIGS. 5 and 6 show sectional illustrations of a second configuration of a connection 1 according to the invention. The connection 1 is arranged on a slightly differently shaped basic body 5 of a further fitting 4. The connection 1 according to FIGS. 5 and 6 has essentially the same elements as the connection 1 according to FIGS. 1 to 4. These elements will therefore not be described anew here.

The illustration of FIGS. 5 and 6 shows an alternative method of fastening the union nut 2 on the connection body 6. In particular it is possible for the retaining ring 3 to be pushed first of all over the connection body 6 until it encloses the latter in the tubular region 11, which has the smallest external diameter of the connection body 6 in the exemplary embodiment. Thereafter, the union nut 2 is positioned on the end side of the connection body 6 and pushed back axially until the retaining ring 3 strikes against a further protrusion 21 of the connection body 6. If the union nut 2 is pressed further onto the connection body 6 in the axial direction, the retaining ring 3 latches, in the first instance, in the annular depression 18. This is illustrated in FIG. 5.

Thereafter, it is possible for the union nut 2, together with the retaining ring 3, to be drawn back in the direction of the end side 7 until the retaining ring 3 is arranged in the retaining region 14, downstream of the projecting periphery 10. The projecting periphery 10 here prevents the union nut 2 from falling off the end side 7 of the connection body 6. The retaining ring 3 is preferably retained in the retaining region 14. This is suitably achieved, for example, by a bead 13 with a depression 12 located downstream of it, as has already been described in respect of the exemplary embodiment according to FIG. 1. This state is illustrated in FIG. 6.

The state which is illustrated in FIG. 5 is also suitable for storing and for transporting the fitting 4. In this state, the overall length of the fitting 4 is reduced slightly in relation to the state according to FIG. 6. Furthermore, the thread 15 of the union nut 2 is protected against damage.

The invention claimed is:

1. A fitting for a pipe joint, having a basic body and at least one pipe connection connected to the basic body, the pipe connection comprising: a connection body produced from a plastics material, the connection body having at least one outwardly projecting periphery in the form of an annular flange, arranged on the end side of the connection body, and having a retaining region located axially downstream of said annular flange; a union nut, which is pushed over the connection body and has an annular depression in a region located opposite the retaining region of the connection body; a retaining ring, which is arranged in the annular depression, between the connection body and the union nut, and secures the union nut in a rotatable manner on the connection body, wherein the connection body, in the retaining region, has an at least partially encircling bead and at least one depression arranged between the bead and the annular flange, wherein the connection body further comprises a tubular region, a widening, conical transition region arranged between the tubular region and the at least partially encircling bead in the retaining region, wherein a first external diameter of the tubular region is smaller than a second external diameter of the at least partially encircling bead in the retaining region, and wherein the annular depression extends from the flange to the at least partially encircling bead, the at least partially encircling bead extends to the conical transition region, and the conical transition region extends to the tubular region, and wherein the at least partially encircling bead and the at least one depression are both contained radially beneath the retaining ring when the fitting is fully assembled.

2. The fitting according to claim 1, wherein the union nut is produced from a metal material.

3. The fitting according to claim 2, wherein the union nut is produced from brass.

4. The fitting according to claim 1, wherein the retaining ring is produced from a plastics material.

5. The fitting according to claim 4, wherein the retaining ring is produced from a polymer material.

6. The fitting according to claim 5, wherein the retaining ring is produced from a polyamide or a polysulfone material.

7. The connection according to claim 1, wherein the connection body is produced from a polymer material.

8. The fitting according to claim 1, wherein the retaining ring comprises a slit, elastic annular body, wherein the annular body extends over an angle range of less than 360°.

9. The connection according to claim 8, wherein the annular body extends over an angle range between 300 and 350°.

10. The fitting according to claim 1, wherein the union nut has a chamfer in the region of a rear side.

11. The fitting according to claim 1, further comprising a seal, the seal being arranged on an end side of the connection body within the union nut.

12. The fitting according to claim 1, wherein the basic body is produced in one piece with the connection body of the at least one connection.

13. The fitting according to claim 1, wherein the basic body is produced from a polymer material.

14. The fitting according to claim 13, wherein the basic body is produced from a polysulfone material.

* * * * *